H. P. STEVENS.
INTERNAL COMBUSTION ENGINE.
APPLICATION FILED JULY 8, 1919.
1,385,099.
Patented July 19, 1921.
3 SHEETS—SHEET 1.
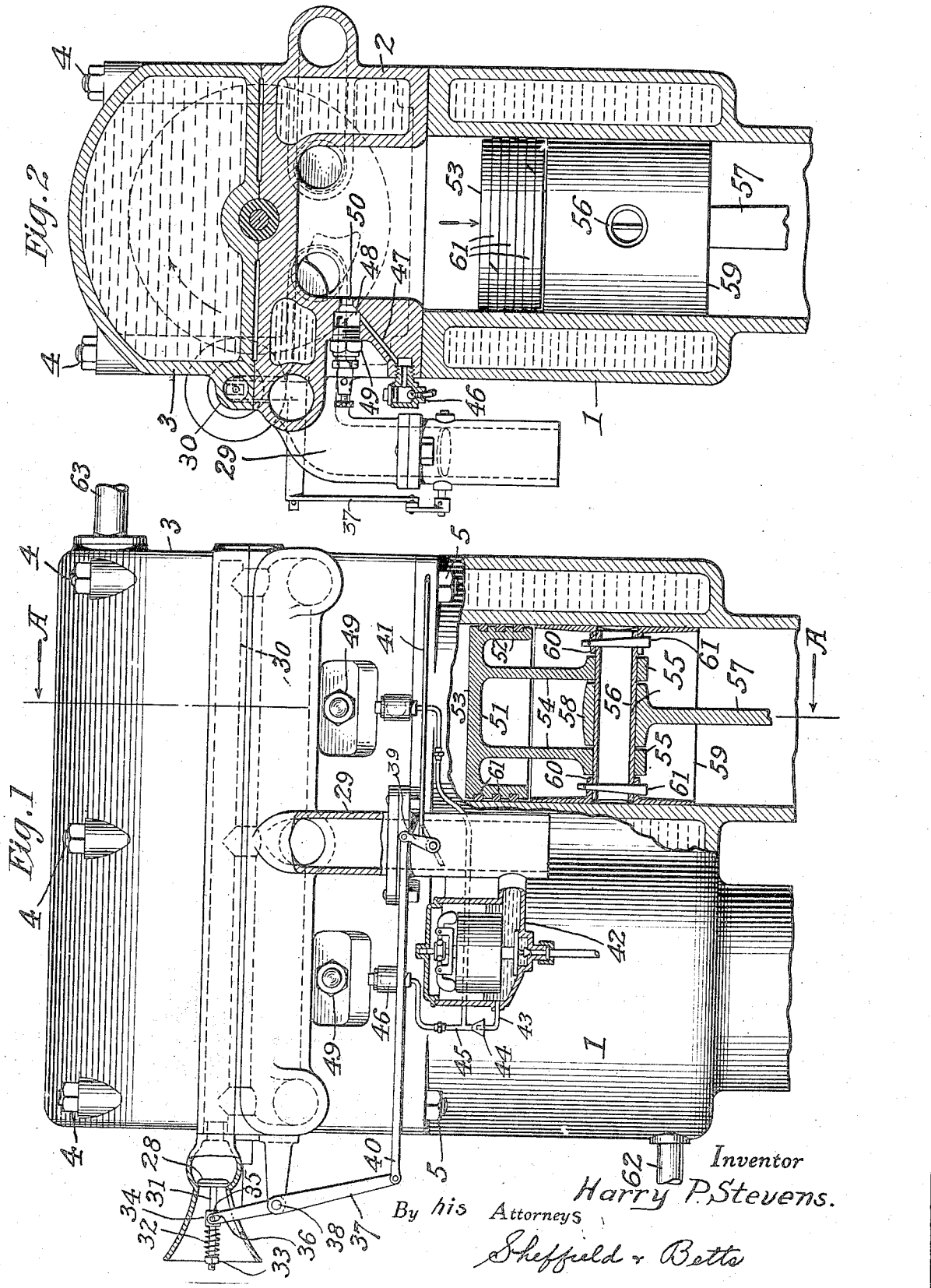
Inventor
Harry P. Stevens.
By his Attorneys
Sheffield & Betts

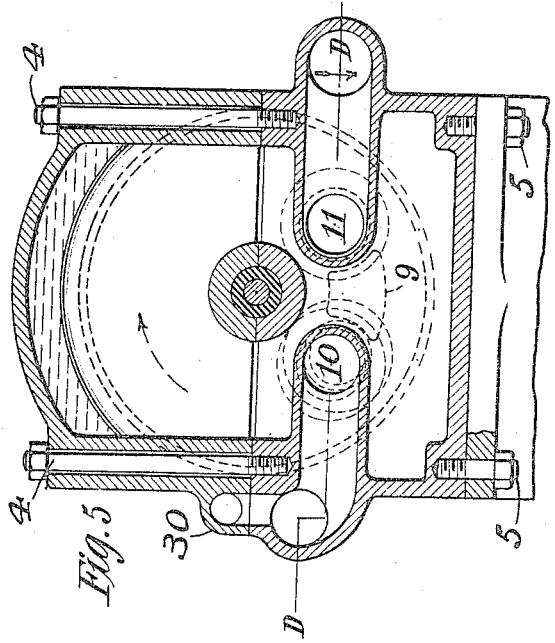
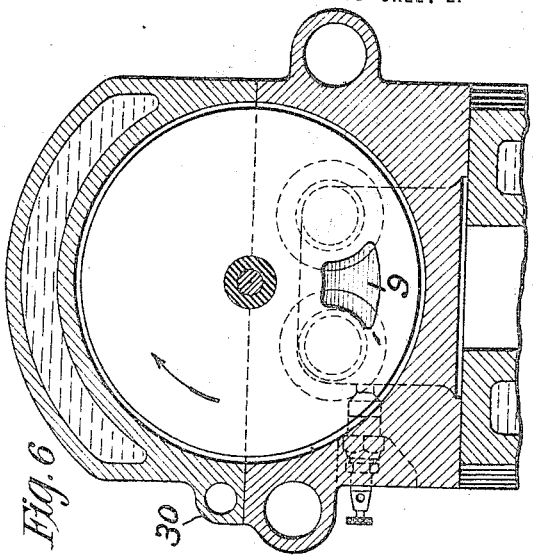
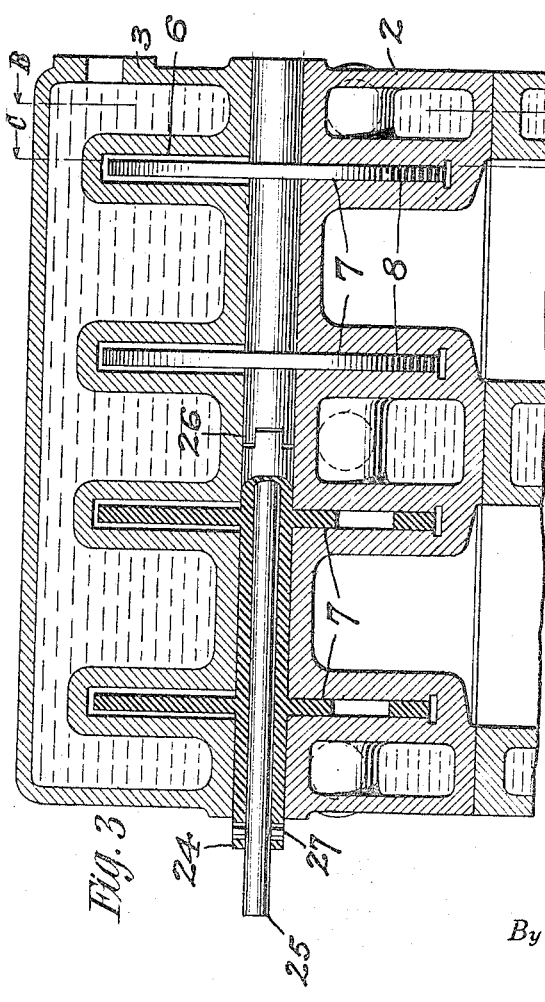
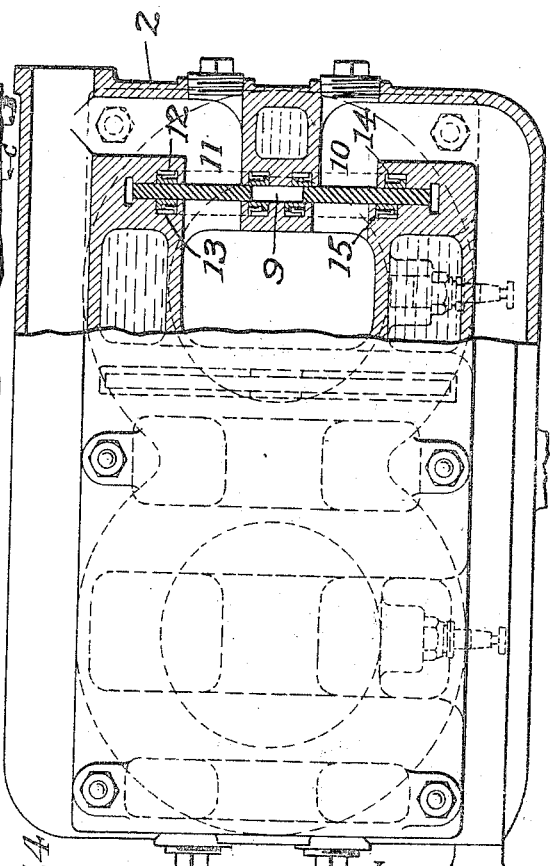

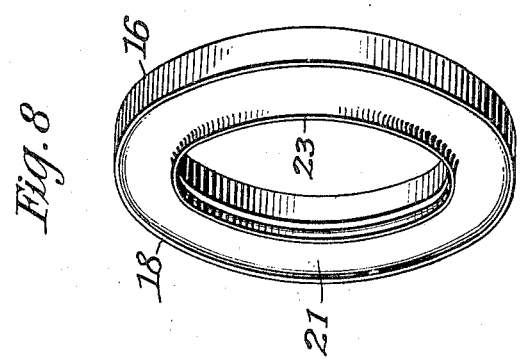
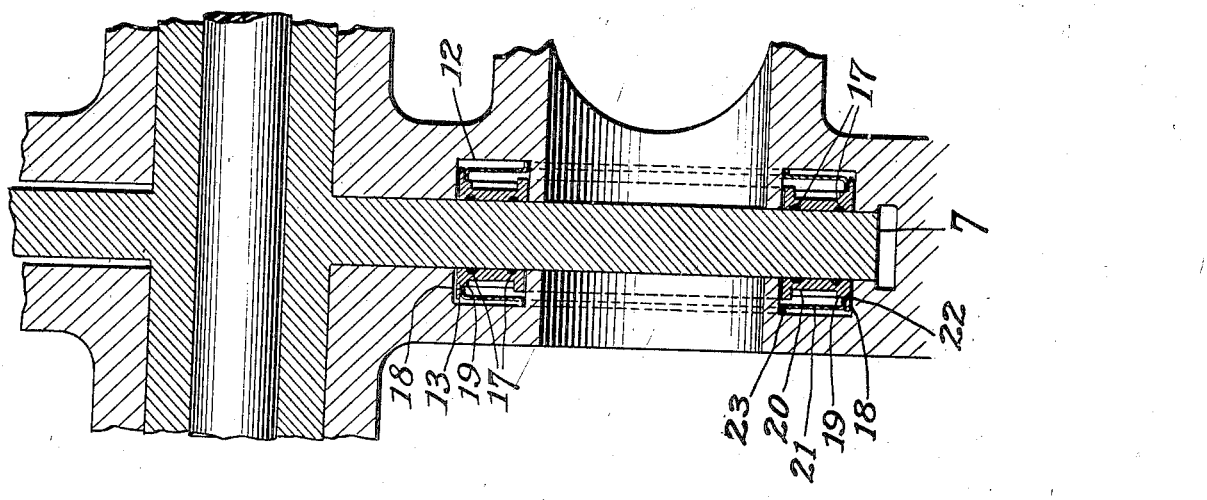

UNITED STATES PATENT OFFICE.

HARRY P. STEVENS, OF NEW YORK, N. Y.

INTERNAL-COMBUSTION ENGINE.

1,385,099.  Specification of Letters Patent.  Patented July 19, 1921.

Application filed July 8, 1919. Serial No. 309,327.

*To all whom it may concern:*

Be it known that I, HARRY P. STEVENS, a citizen of the United States, residing in the city of New York, borough of Manhattan, county and State of New York, have invented certain new and useful Improvements in Internal-Combustion Engines, of which the following is a full, clear, and complete description.

This invention relates to various improvements in the operating parts of internal combustion engines, particularly those designed for use in automobiles and other motor vehicles.

In my prior Patent No. 1,249,235, dated December 4, 1917, I have described and claimed certain improvements in internal combustion engines relating to rotary valves therefor.

The improvements forming the subject matter of this application relate to additional features of said rotary valves and to other operating parts. One of the features of these improvements resides in the relative arrangement of the inlet and exhaust ports of the valves controlled by rotary disks so that a proper timing of the inlet to and exhaust from the cylinders is brought about.

Another feature of this invention relates to a sectional arrangement of the cylinder casing, combustion chamber and valve housing, so that the said parts may be easily assembled and disassembled, and access may be more easily obtained to the internal parts of the engine.

Another feature of this invention comprises an arrangement of disk valves rigidly connected so that the two balanced valves for each cylinder are caused to operate in unison accurately and positively.

Another feature of this invention comprises an automatically regulated auxiliary inlet for air to be mixed with the explosive gases or vapors, so that said gases or vapors will be diluted when the engine is running at high speed, but will not be diluted and will be maintained as rich explosive mixtures when running at low or intermediate speeds.

For a detailed description of the features of my invention which I at present deem preferable, reference may be had to the following specification and to the accompanying drawing forming a part thereof, in which Figure 1 is a side elevation of a two-cylinder combustion engine, one of the cylinders being broken away and shown partly in longitudinal section in order to disclose the construction of the piston head and guide therefor, the gas and air inlet being also shown partly in section to illustrate the arrangement of the auxiliary air inlet valve. Fig. 2 is a transverse sectional view taken substantially in the line A—A, Fig. 1. Fig. 3 is a vertical sectional view taken substantially through the axis of the valve operating shaft. Fig. 4 is a plan view partially in horizontal section, taken substantially on the line D—D, Fig. 5, showing the arrangement of the exhaust and inlet ports relative to one valve, and the application of the packing rings in connection with the disk valves and ports. Fig. 5 is a partial vertical sectional view taken substantially on the line B—B, Fig. 3, and Fig. 6 is another vertical sectional view taken substantially on the line C—C, Fig. 3. Fig. 7 is a horizontal sectional view through one-half of one of the disk valves showing the details of the improved packing ring applied thereto, and Fig. 8 is a perspective view of one of the packing rings.

Referring to the drawings, particularly Figs. 1 and 2, the numeral 1 indicates the engine cylinder section of the engine which is chambered and water-cooled in the usual way. The numeral 2 indicates the combustion chamber section of the engine which carries the inlet manifold, the spark plugs and auxiliary gas inlet valves for the spark plug pockets. The numeral 3 indicates the upper portion of the valve housing, which is also preferably water cooled, as indicated. These three sections of the engine are preferably cast as integral pieces, and are connected together by suitable bolts 4, as indicated most clearly in Fig. 5. The valve housing section 3 is provided with the necessary number of semi-circular recesses 6, so that two valve disks 7 may be used with each cylinder and combustion chamber. The combustion chamber, section 2, is also provided with semi-circular recesses 8 in which the disk valves 7 revolve. These recesses 8 are made of such width that they fit the valves closely but not so tightly as to produce friction. The recesses 6, in section 3, may be made somewhat wider, since actual contact with the disks is not essential, provided there is a sufficiently close relation to allow the heat to be conducted away to the cooling fluid in the cooling chambers. In the valves 7 openings 9 are provided which are caused to pass the inlet and exhaust ports 10 and 11 respectively as the disk revolves.

The casing of the combustion chamber, section 2, of the engine, is provided with cylindrical grooves on each side of the valve disk recess around the inlet and exhaust ports, as indicated at 12, 13, 14 and 15 in Figs. 4 and 7. Within these grooves is placed a new form of packing ring whose construction is indicated in detail in Figs. 7 and 8. This packing ring comprises a steel ring 16, which is substantially flat on the side which contacts with the valve disk, but which may be provided with oil grooves 17, as indicated in Fig. 7. The opposite side of the ring 16 is recessed in the form of a circular groove, thereby forming an outer cylindrical flange 18 and an internal annular seat 19. The central portion of the annular groove may be further depressed, as indicated at 20, in order to reduce the thickness of the valve ring to the desired amount. Within the cylindrical flange 18 and resting upon the annular seat 19 is an annular ring 21 of comparatively thin resilient material, such as bronze or other preferred metal. This annular ring is provided with two marginal flanges extending in opposite directions from the surface of the ring, the outer marginal flange 22 contacting with the flange 18 of the groove in the ring 16, and the inner flange 23 resting on the side and bottom of the groove 12 in the combustion chamber casing. The resiliency of the annular ring 21 forces the steel contact ring 16 against the face of the disk 7 under normal conditions. When the pressure increases within the combustion chamber during the compression stroke and the ignition stroke of the piston, any gases leaking between the surface of the valve disk 7 and the margin of the port will immediately increase the pressure between the grooved ring 16 and the resilient ring 21, thereby tending to force the ring 16 more positively toward the valve disk and at the same time will tend to make the contact between the flange 23 and the side of the groove 12 more positive. Furthermore, the pressure upon said flange 23, caused by the resiliency of the metal of the ring 21, will tend to expand the flange 22 and make a tight joint between the same and the cylindrical flange 18 of the ring 16. Thus it will be seen that the valve ring is of unusual efficiency in preventing the passage of air or gases at the time of the greatest pressure in the combustion chamber, while at other times the friction contact with the valve disk is so slight as not to produce any considerable frictional drag on the valve disks themselves.

I do not wish to be understood that the use of the above described packing rings is limited to the particular use herein stated, for said packing rings may be adapted to a variety of other apparatus without departing from the scope of this feature of my invention.

One feature of the arrangement of these packing rings is indicated particularly in Figs. 4 and 5, in which it will be noted that the opposite openings and the rings 14 and 15 of the inlet port 10 are off-set circumferentially in relation to the axis of the valve shaft. This off-set is introduced for the following reasons:

It has been found necessary in timing the valves of internal combustion engines, to delay the opening of the intake valve beyond the instant of closing of the exhaust valve, in order that the pressure in the cylinder may be reduced sufficiently by the movement of the piston after the exhaust valve closes, to create an initial suction or partial vacuum, so that when the intake valve opens there will be a sufficient suction or partial vacuum in the combustion chamber to cause the fuel mixture to instantaneously and positively enter the combustion chamber and cylinder without any tendency to force the incoming mixture in the opposite direction from that in which it is intended to flow. Consequently, the exhaust is caused to close when the crank pin has passed a few degrees beyond the extreme end of the stroke of the piston. Thereafter there is a space of a few degrees before the intake valve opens. This further reduces the pressure in the combustion chamber so that when the intake valve begins to open, the mixture is immediately drawn into the combustion chamber under positive suction without any liability of back flow. In order to accomplish this result with my form of disk valves, I have caused the ports and the packing rings 14 and 15 to be off-set as indicated.

By referring to Figs. 5 and 6 it will be noted that the opening 9 in the valve disk 7 connects with the inner or left hand portion of the intake port 10 before it connects with the outer or right hand portion of the same intake port, and that the port does not actually begin to open until the latter action occurs. Thus the opening of the intake is delayed an amount equal to the angular off-set of the two parts of the ports and their corresponding packing rings 14 and 15. When the intake port is closed the actual closing occurs when the rear edge of the opening 10 approaches the nearest or relatively advanced side of the left hand portion of the intake port. In this manner the opening of the intake is delayed while the closing of the intake is at a point substantially what it would have been had the packing rings on the opposite sides of the disk not been off-set.

Thus I have accomplished the object above pointed out of producing positive suction for the incoming gases at the desired point.

Referring to Fig. 3, it will be noted that the two valve disks 7 for each cylinder are connected together integrally by a sleeve 24 through which the solid valve shaft 25 of the engine passes, thus connecting said disks rigidly with each other so that there is no tendency for one to twist in relation to the other or be displaced. The sleeves 24 for the respective cylinders are connected together by correspondingly shaped projecting lugs and recesses, as indicated at 26, and these connections may be repeated, according to the number of cylinders to be used. The sleeves 24 and shaft 25 are connected together so as to turn in unison by suitable means, such as transverse pin 27 or other well known key connections. Valve shaft 25 is caused to rotate in any suitable way, such as by being geared or otherwise connected with the main crank shaft, specific description of which is not deemed necessary.

Referring now to Figs. 1 and 2, it will be noted that I have provided a valve 28, which, when open, permits air to enter the auxiliary air manifold 30. The auxiliary manifold has openings into the fuel manifold adjacent the valve ports so that cold air is supplied directly to said ports and there mixed with the incoming gas. The main manifold is preferably made of smaller diameter than is usual in the standard automobile engine. The auxiliary manifold is preferably provided with a funnel or "Venturi" shaped entrance extending forward from the front end of the engine and in which the valve 28 is located. This valve is so controlled automatically that it will open only when the engine is running at high speed and will remain closed when the engine is running at low and intermediate speeds and a rich mixture is required. This is accomplished by the following means: The valve stem 31 is provided with a helical compression spring 32 which is confined by a nut 33 and a short sleeve 34. The sleeve 34 is provided with a lateral projection 35 engaging a slot 36 in the lever 37 which is pivoted at 38. The lower end of the lever 37 is connected with the arm 39 of the throttle valve by a rod 40. The arm 39 of the throttle valve is connected in the usual way by a rod 41 with the throttle control lever on the steering wheel. The helical spring 32, being always under compression, will tend to maintain the valve 28 upon its valve seat, thereby closing the air intake.

When the throttle valve is partially open, as in starting the engine, the arm 39 is moved but slightly from its closed position, which in the drawing would be substantially 45° from the vertical, (the valve as illustrated being shown slightly open). This position of the throttle valve arm 39 maintains the lower end of the lever 37 in a position toward the right, while the upper end of the lever 37 is maintained toward the left, thus keeping the spring 32 under considerable compression, and thereby preventing the valve 28 being opened by the suction in the combustion chambers. When the throttle valve is further opened, such as when running at high speed, the force of the spring 32 is correspondingly reduced until the compression has been released to such an extent that the suction caused by the operation of the pistons will be sufficient to overcome the reduced compression of the spring, and thereby open the valve, allowing the air to enter the manifold. A further advantage of the use of the auxiliary air manifold is that the fuel manifold can be made of comparatively small diameter so as to produce a sufficient velocity of the gas when running at low or intermediate speeds when the auxiliary manifold is closed to prevent condensation or collection of fuel on the walls of the main manifold. On the other hand, when running at high speeds with the auxiliary manifold open, the same high velocity may be maintained in the main manifold without a throttling effect and the necessary volume of explosive mixture is supplied to the cylinders to produce high efficiency and a low consumption of fuel.

Referring further to Figs. 1 and 2, the numeral 42 indicates a carbureter of the float control type, or other well known or preferred form. This is connected with the main fuel supply pipe 29 in the usual manner. The lower portion of the float chamber of the carbureter 42 is connected with an auxiliary outlet pipe 43 which connects with a small auxiliary carbureter 44, where a mixture of fuel and gas is injected into the supply pipe 45, leading to a check valve 46. The check valve 46 is connected by an internal passage 47, with a pocket 48, in which the spark gap of the spark plug 49 is located, said pocket being in communication with the combustion chamber through the passage 50. As a result of this arrangement the suction of partial vacuum produced in the combustion chamber by the downward stroke of the piston at the time fuel is supplied through the main carbureter will act to cause an additional amount of explosive mixture to pass through the carbureter 44, pipe 45, check valve 46, and passage 47 into the pocket 48. When the ignition occurs the spark gap will be surrounded by a fresh mixture of the fuel and air and will therefore positively and reliably ignite the main charge of the mixture in the combustion chamber. This obviates any possibility of the products of combustion of the previous explosion being retained within the space surrounding the spark gap.

Referring again to Figs. 1 and 2, the numeral 51 indicates the piston head comprising the cylindrical portion 52 and the circular portion 53. From the circular portion 53 a pair of arms or webs 54 project downwardly and are provided at their lower ends with bearings 55 which engage a sleeve or hollow wrist or connecting pin 56. A connecting rod 57, the lower end of which has a bearing upon the main engine crank shaft, is provided with a bearing 58 at its upper end, engaging said sleeve 56 between the bearings 55. The numeral 59 indicates a cylindrical guide or cross head, preferably made of iron or steel, provided with two diametrically opposite inwardly extending flanges 60 which receive the ends of the sleeve 56. The flanges 60 and the ends of the sleeve 56 are connected by any suitable means, such as the tapering pins 61.

From the construction just above described it will be apparent that the heat of combustion of the gases in direct contact with the circular portion 53 of the piston 51 will be absorbed to some extent by the metal of the piston head. This will, however, be conducted to the guide or cross head 59 to a large extent and thence to the walls of the cylinder where it will be absorbed by the cooling fluid. Thus extreme changes of temperature of the cross head 59 will be obviated to a large extent and the tendency of the cross head to vibrate owing to excess clearance otherwise required will be greatly reduced. The expansion and contraction of the piston head 51 will be taken care of by the packing rings 61 applied in the usual manner.

All of the chambers for the cooling fluid are preferably connected together so that the fluid may enter at one point, such as by the pipe 62, and be withdrawn at another point, such as by the pipe 63.

It is obvious that the above described features of my invention are not limited to an internal combustion engine of two cylinders, but may be applied to an engine having any number of cylinders, two being illustrated for convenience only.

Having thus described this form of these features of my invention, I do not wish to be understood as being limited to the details of form and arrangement of parts herein set forth, for various changes may be made and equivalent means used without departing from the spirit and scope of my invention.

What I claim and desire to protect by Letters Patent is:

1. In combination with a casing having a port therein, a rotary disk valve having an opening therein and adapted to open and close said port, opposite edges of portions of said port on the opposite sides of said disk valve being displaced relatively in a circumferential direction, to alter the points of the initial opening and the final closing of said valve.

2. In combination with a casing having a port therein, a rotary disk valve having an opening therein and adapted to open and close said port, the portions of said port on opposite sides of said disk valve being off-set in a circumferential direction relative to each other to alter the points of the initial opening and the final closing of said valve.

3. In combination with a casing having a plurality of ports therein, a rotary disk valve having an opening therein and adapted to open and close said ports successively, the portions of one of said ports on opposite sides of said disk valve being off-set in a circumferential direction relative to each other to vary the points of opening and closing of said port relative to another of said ports.

4. In combination with the casing of an internal cumbustion engine having inlet and exhaust ports therein, a rotary disk valve having an opening therein and adapted to open and close said ports successively, the portions of one of said ports on opposite sides of said disk valve being off-set in a circumferential direction relative to each other, to vary the points of opening and closing of said port relative to the other port.

5. An internal combustion engine made in three detachable transverse substantially parallel sections at right angles to the cylinder, rotary disk valves for controlling the inlet and exhaust ports, and having a connecting sleeve, a longitudinal shaft in said sleeve for operating said valves, one of said sections comprising the cylinder casing, one section comprising the combustion chamber and complete inlet and exhaust ports, and one section comprising the valve cover, said latter two sections being complementally recessed to receive said disk valves, sleeve, and said valve shaft, and means for connecting said sections together.

6. An internal combustion engine made in a plurality of detachable substantially parallel transverse sections at right angles to the cylinders, one section comprising the cylinder head and complete inlet and exhaust ports and having a manifold thereon, and one section comprising a valve cover and having a manifold thereon, said sections having passages connecting said manifolds adjacent to said inlet ports.

7. In combination with an engine cylinder casing, an integral combustion chamber casing having inlet and exhaust ports, and an integral longitudinal valve cover, rotary disk valves, a shaft for rotating said valves simultaneously, said combustion chamber casing and said valve cover being recessed complementally to receive one-half each of said disk valves and shaft, and each being also provided with a manifold and having intercommunicating passages adjacent the inlet ports.

8. An internal combustion engine made in three transverse substantially parallel sections at right angles to the cylinder, rotary disk valves for controlling the inlet and exhaust ports and having a connecting sleeve, a longitudinal shaft within said sleeve, one of said sections comprising the cylinder casing, one section comprising the combustion chamber, complete inlet and exhaust ports, and a manifold, and one section comprising the valve cover and also having a manifold thereon, said latter two sections being recessed to complementally receive said disk valves, sleeve and shaft and having passages adjacent said inlet ports for connecting said manifolds, and means for connecting said sections together.

Signed this 7th day of July, 1919.

HARRY P. STEVENS.